March 10, 1970 R. B. ARPS 3,499,975

REPEATED SCAN DIGITALLY CODED FACSIMILE TRANSMISSION

Filed Dec. 12, 1966 2 Sheets-Sheet 1

INVENTOR.
RONALD B. ARPS

BY *Arthur Decker*
ATTORNEY

March 10, 1970 R. B. ARPS 3,499,975

REPEATED SCAN DIGITALLY CODED FACSIMILE TRANSMISSION

Filed Dec. 12, 1966 2 Sheets-Sheet 2

United States Patent Office 3,499,975

Patented Mar. 10, 1970

3,499,975

REPEATED SCAN DIGITALLY CODED FACSIMILE TRANSMISSION

Ronald B. Arps, Dallas, Tex., assignor to International Business Machines Corporation, Armonk, N.Y., a corporation of New York Filed Dec. 12, 1966, Ser. No. 600,995

Int. Cl. H04n 1/36

U.S. Cl. 178—6 6 Claims

ABSTRACT OF THE DISCLOSURE

A facsimile transmitter wherein a mechanical flying spot scanner repeatedly scans a line of a document. The output of this scanner is passed through a converter which converts the signal to a bilevel pulse train. This train is encoded by a suitable encoder, passed through a register in series and on to a buffer in series. This information is then passed in parallel from the buffer through the register and is read out of the register in series to a data set. The only addressing pulses required in the scheme would be the margin indicators. This is made possible by the encoder not receiving line information until the buffer is capable of handling a full line. At this time, the encoder accepts information from the scanner to thereby encode a full line of information and pass it into the buffer.

Figure 1:
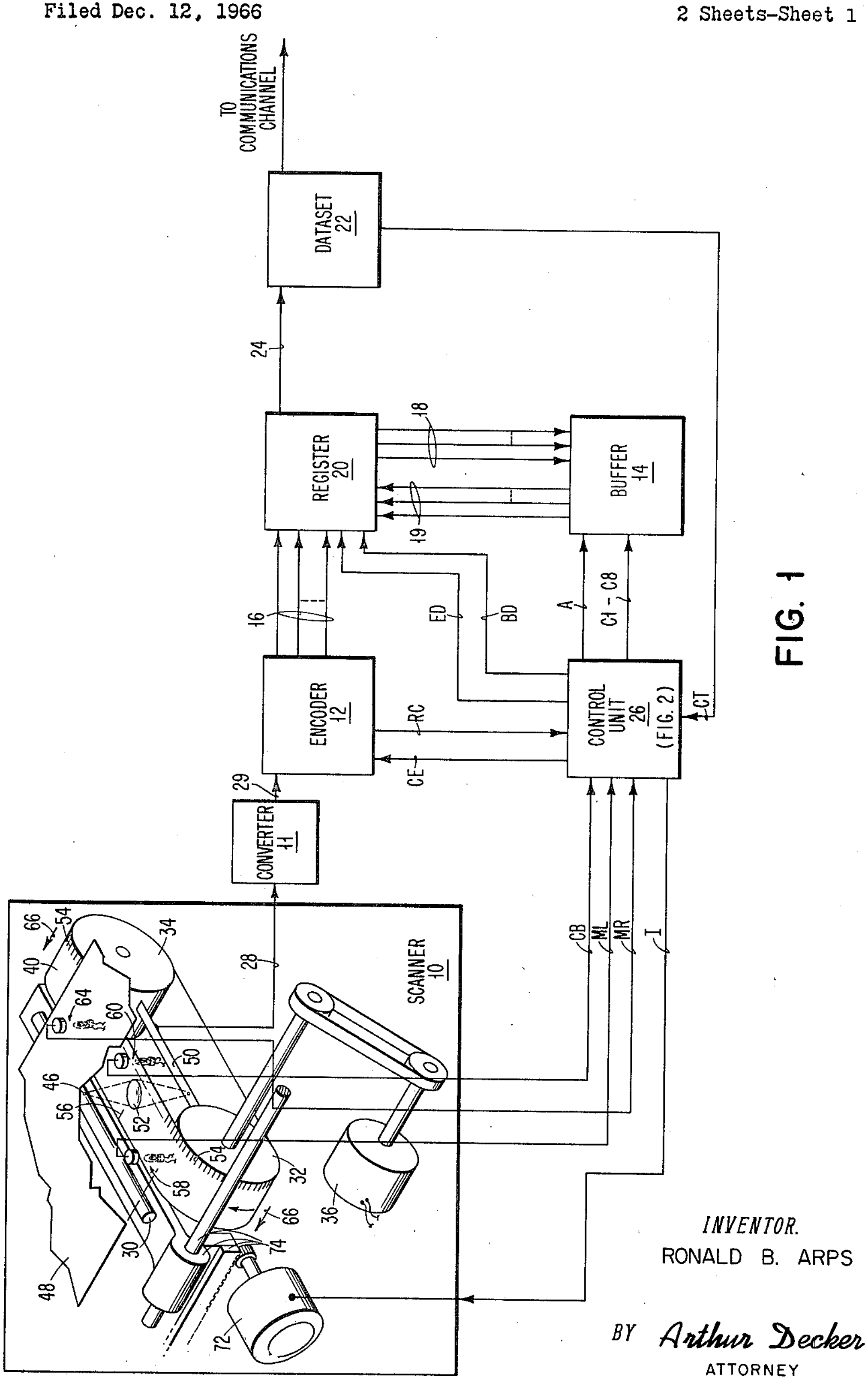

This invention relates to facsimile communication systems and, more particularly, to a scanning technique and its control whereby digital codes representing pictorial, printed, written, etc., information are generated and transferred to a communications link such as a dataset.

In facsimile communications, increased speed of transmission, reduction in bandwidth requirements and economy of equipment are ever-present constraints on system design. As a result, special coding techniques have evolved: thus, run-length coding was conceived to permit the reduction of information redundancy, the consequence of including an encoder in the transmitter and a decoder in the received being more than made up by the saving in bandwidth and/or time. Also, attention has been directed to the scanner: discontinuous as well as continuous scanners, both using electronic techniques such as the well known "flying spot" of a cathode ray tube, or mechanical techniques such as a moving belt, have been devised. Additionally, discontinuous and continuous encoder-decoders have been described in the literature.

In general, it is desired that, in the transmitter, the scanner an dencoder provide information codes at a rate in excess of that acceptable to the dataset, and, in the receiver, that the printout device accept information codes at a rate in excess of that provided by the decoder. Thus is indicated a need for delaying, for instance, the encoder output, either in the time domain (by scanning-encoding discontinuously), or in the space domain by including an intermediate storage (buffer memory). The practice of the present invention may be characterized as utilizing both of these techniques: in the facsimile transmitter, the scanner feeds the encoder continuously, while repetitively sweeping the same pictorial line. The encoder in turn inserts its codes into a buffer a line's worth of codes at a time, whenever the buffer fill falls below a pre-established amount (because of drain from the dataset). Only when a transfer to the buffer is made does the scanner move its spot to the next line of vertical orientation. Codes produced by line sweeps occurring when the buffer exceeds the pre-establishment amount of fill, are ignored. Thus, there is uninterrupted encoding of entire lines, with intermittent transfer of codes corresponding to entire lines to the buffer. In this way, it is not necessary to provide equipment to "remember" where, in the line, the spot sweep provided the last transferred code, it is not necessary to employ an intermittent sweep, and it is also not necessary to provide a buffer of exceptional size.

An object of this invention, associated with the above features, is to provide a facsimile system for pictorial or similar matter which incorporates scanning utilizing spot deflection operative without severe constraints.

Another object of the invention is to provide a facsimile system that derives codes corresponding to the source image at a rate commensurate with the acceptance rate of the communications equipment (typically, 2000 bits per second).

It is another object of this invention to provide facsimile scanning independent of severe problems due to instability of deflection; for instance, those caused by the inherently different horizontal and vertical scanning requisites.

It is a further object of this invention to provide a run-length code generating technique capable of feeding a commercial utility such as a switched telephone network through a transmission terminal comprising, typically, a modulator, synchronizer, amplifiers, etc. of conventional design.

It is also an object of this invention to provide a facsimile system characterized by reduced scanning speeds, thereby allowing the use of scanners of simple, reliable and economical configuration. A feature of the invention associated with this object is a scanner which may be considered of the mechanical type as distinguished from those which are basically electronic.

However, it is a general object of this invention to provide an efficient, run length, digitally encoded, facsimile transmission system.

The foregoing and other objects, features and advantages of the invention will be apparent from the following more particular description of a preferred embodiment of the invention, as illustrated in the accompanying drawings.

Figure 2:
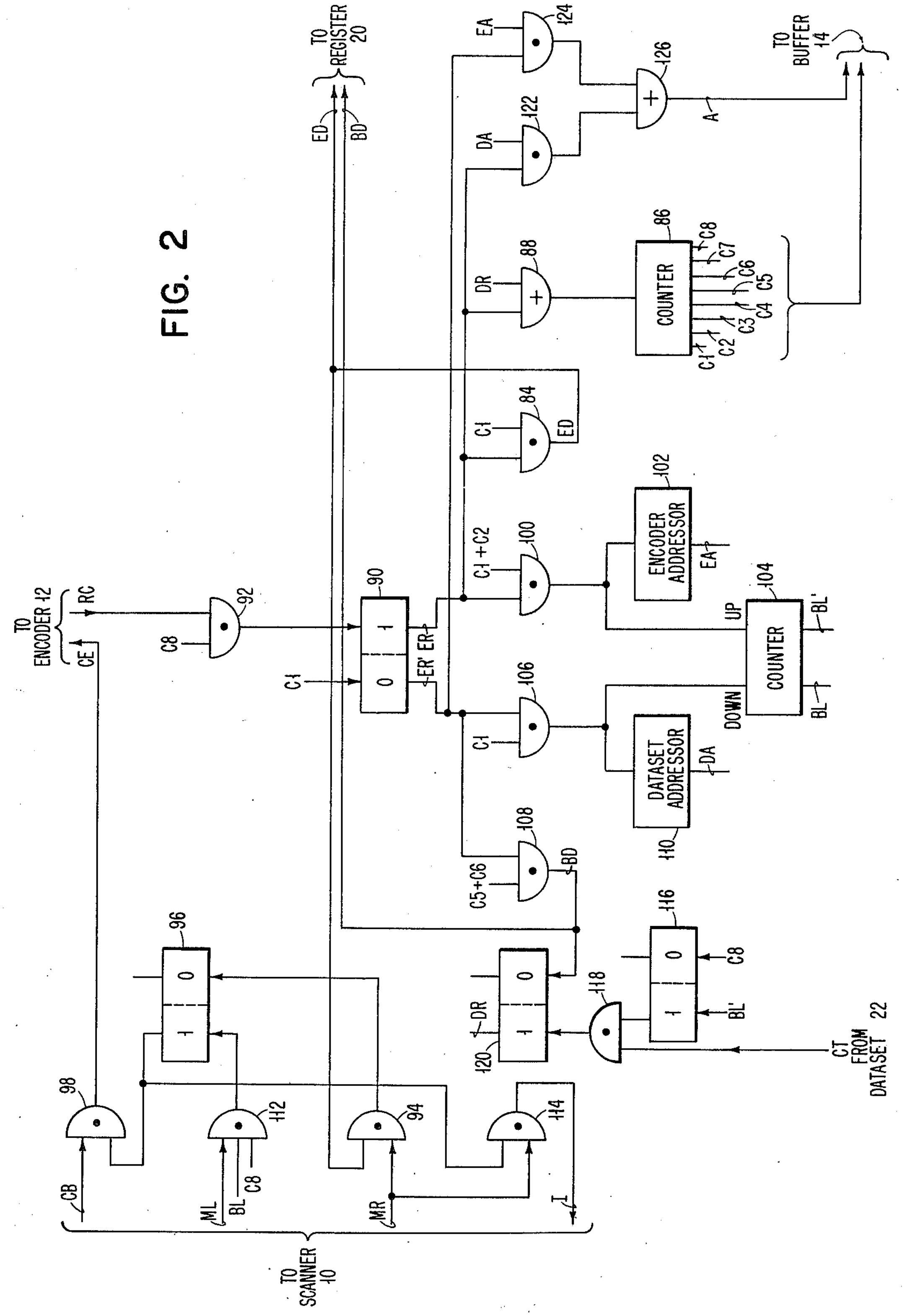

FIGURE 1 is a block diagram of the facsimile transmitter contemplated by the invention; and FIGURE 2 is a block-schematic diagram of the control unit of the invention.

Referring to the facsimile transmitter shown in FIGURE 1, the combination of scanner 10, converter 11 and encoder 12 may be considered a source of digital signals presented in parallel on lines 16 to register 20, which signals pass in parallel through buffer 14 via lines 18 and 19, back to register 20 and thence serially on line 24 to dataset 22 or some other utilization device; control and synchronization of this data flow is provided by control unit 26.

Scanner 10 functions to convert the light reflectivities of elemental areas of a document into an electrical signal and may be considered as photoelectric-mechanical in structure. Document 48 is illuminated from below by lamp 30 and scanned from said to side, a reflected spot of light 46 thereof, being focused by lens 52 onto photoelectric cell 50. The output of cell 50, an analog signal, appears on line 28, and is translated by converter 11 to a bilevel pulse train on line 29 corresponding to the dark or light appearance of the scanned elemental areas. The pulse train results from the traverse of lens 52 across document 48 repetitively in a horizontal line through motion of belt 40 imparted by rolls 32 and 34, the former of which is driven continuously by motor 36 so that belt 40 moves at about 300 inches per second. Belt 40 is also provided with transparent slots 54 and 56. In conjunction with slots 54, photoelectric device 60 emits a train of clocking pulses, designated CB, for defining the elemental areas on a line. In conjunction with slot 56, photoelectric devices 58 and 64 emit pulses, designated ML and MR, respectively, identifying the left and right margins of document 48. The generated data pulse train (output on line 28), it will be seen, is considered as significant only during the time interval between the sensing of pulses ML and MR.

In the arrangement of scanner 10 selected for presentation here a line is swept repetitively, and the resulting data converted to a bilevel signal and is fed to encoder 12 on line 29. After a line of data is processed, i.e., accepted by encoder 12 and register 20 and buffer 14 for storage, scanning of the next line occurs. Successive lines on document 48 are traversed through vertical stepping in scanner 10, as shown by arrows 66 adjacent rolls 32 and 34, provided by combination 74, consisting of a gear, rack, support and way. Combination 74 is activated by motor 72, which steps on receipt of an increment pulse I received from control unit 26.

Other typical scanning devices of this nature, easily adaptable to the present system, are found in Patents 2,958,851 and 2,897,481 and in the publication "Reduced-Time Facsimile Transmission by Digital Coding" by Wyle, Erb and Banow, IRE Transactions on Communications Systems, September 1961, page 215.

Presuming that document 48 contains typewriten horizontal lines of print, in this system each line is scanned continuously and repetitively by sweeps of constant velocity of spot 46; correspondingly, encoder 12 accepts the data pulse train on line 28, and provides parallel-by-bit count outputs, on lines 16, each representing the number of sequential elemental areas of the same reflectivity scanned during a line sweep, i.e., the number of elemental areas between changes of darkness in a line on document 48. Thus, if about 1000 elemental areas per line are called for and the scanned line contains a sequence of 128 of one shade at its end, a count of 128 would be generated by encoder 12 at completion of the line sweep. However, if the line ends with a checkerboard pattern, 128 counts of 1 would be generated. Thus, encoder 12, in essence, comprises a counter of belt clock signal pulses CB of scanner 10, its counts being synchronized by changes in darkness in a line, and the count being a 7-bit parallel code on lines 16. Accompanying the count, on a separate line among lines 16, is an eighth bit which changes for each generated counter, thereby identifying its count as corresponding to a black area or a white area on document 48. This type of coder is suitable for present purposes, although it is recognized that the most efficient code is one of variable word lengths corresponding to the logarithms of the inverse probabilities of the respective run lengths. It is also to be noted that the operation of encoder 12 is gated to operate by clock signal CB which, as will be shown, is generated by control unit 26 after the occurrence of left margin signal ML and only if storage in buffer 14 is available. Encoder 12, in addition to providing the data codes on line 16, also generates a pulse, designated RC, transmitted to control unit 26 at the time that a code is complete and ready for transfer.

Register 20 comprises a shift register which receives, on lines 16, the codes emited by encoder 12, transfers them in parallel to buffer 14 on lines 18, and receives them from buffer 14 on lines 19; register 20 serializes the codes and shifts out to dataset 22 on line 24. A register of this type in an environment similar to that presently being described is shown in patent application Ser. No. 417,293, filed Dec. 10, 1964, entitled Digitally Coded Facsimile Transmission, wherein it also contributes the function of buffer 14. Further discussion of register 20 will follow in connection with a description of control unit 26.

Buffer 14 comprises a small memory for which register 20 acts as a data input/output device and control unit 26 acts as an addressor. Buffer 14 may take the form of any of the types of addressable memories known to the art, and will be discussed further in connection with control unit 26.

Dataset 22 is the unit which emits the data codes to the transmission channel, and to the operating speed of which are synchronized transfers among encoder 12, register 20 and buffer 14. To indicate when it is ready to receive a code from register 20 in line 24, dataset 22 generates a pulse CT which is fed to control unit 26.

Turning now to FIGURE 2, here is shown a diagram of control unit 26, which functions to allocate signals, both data and control, among the other components of the system. Thus, as is shown, connection is made between control unit 26 and each of the other units of the system (FIGURE 1); these connections will now be related to the circuitry in control unit 26.

To review briefly, scanner 10 sweeps continuously to provide an analog signal to converter 11 which generates a binary pulse train for encoder 12; this signal is preceded and followed by margin marker pulses ML and MR, and is accompanied by clock pulse train CB; scanner 10 receives pulse I instructing it to generate a different signal train when a present one has been accepted by register 20 and buffer 14 through encoder 12. The latter encodes the data signal on receipt of clock pulse train CE from control unit 26 (which indicates that buffer 14 is ready to accept codes); in addition to generating and transferring its codes, encoder 12 emits a pulse RC for each code it generates. This signal is used by control unit 26 to address buffer 14 for storage of the code. As the new code is stored in buffer 14 by register 20, the former, addressed by control unit 26, may slightly delay read-out of a stored code bit from buffer 14 to dataset 22. This delay is of no consequence since code bits are normally read from buffer 14 in advance of the time they are needed by dataset 22. Note that the storing of codes from a line can interleave with bit transfers to dataset 22, and are not required to all occur between one pair of dataset bits.

It has been pointed out that control unit 26 times the activities of the other components of this system. For this purpose, control unit 26 generates, on command, a repetitive series of clock pulses, designated C1 through C8, to synchronize the occurrence of signals used in operating buffer 14. These counts are generated by counter 86, and, after count decoding, appear on its output lines as shown; it should be understood that these lines are "true" (i.e., effective in priming gates and triggering bistable circuits) only during their designated bit period intervals. Such counting and count decoding systems are considered sufficiently well known in the computer arts to justify omission of detailed descriptions here, except to specify that counter 86 cycles once only when instructed by signal ER or signal DR operating through OR gate 88.

Signal ER appears as an output of bistable state circuit 90, which, as are all bistable state circuits of this system, is preferably a flip-flop of the R–S type (cf. M. Phister, Jr.—Logical Design of Digital Computers, John Wiley & Sons, Inc., New York 1958). Signal ER indicates occurrence of signal RC from encoder 12 at C8, via AND gate 92, thereby informing control unit 26 that encoder 12 has generated another code. Thus, when encoder 12 is prepared to transfer another code to register 20, counter 86 provides sequential energization of its output lines.

Similarly, signal DR is seen as an output of flip-flop 120, effective when gate 118 is energized simultaneously by signal CT from dataset 22 and the output of flip-flop 116 activated by signal BL′. Signal CT, as has been noted, indicates readiness of dataset 22 to receive another code. Signals BL and BL′, the outputs of counter 104 to be discussed, indicate a number of codes being stored in buffer 14 appropriate for a read-out therefrom (signal BL′ is high) or not (signal BL is high) when dataset 22 is first called. Thus, when dataset 22 is prepared to receive its first code from register 20, and counter 104 indicates that buffer 14 has acquired sufficient content, counter 86 provides sequential energization of its output lines.

Signal ER is noted as an input to AND gate 84, which is opened during period C1 to generate signal ED. Signal ED is fed to register 20 wherein gates are primed to accept the code being emitted on lines 16 (FIGURE 1) by encoder 12.

During period C1–C2 signal ER passes through AND gate 100 to energize encoder addressor 102, which comprises a unit (well known in the art) capable of causing, via signal EA, the look-up (access) of an address in buffer 14 for either recording or sensing information; in this case, an address is made available for the code being received from register 20 on lines 18 (FIGURE 1). When however, flip-flop 90 is false, thereby causing signal ER′ to be high, gate 106, during period C1, energizes dataset addressor 110 to generate signal DA, also used to look up an address in buffer 14, in this case, for transmitting a code to register 20 on lines 19. Signals DA and EA are both fed to buffer 14 and are exclusively selected by signal ER and its complement signal ER′ through gates 122, 124 and 126, which in combination, form an exclusive OR circuit. The outputs of gates 100 and 106, respectively also cause a unit count to be added to or subtracted from counter 104, which keep track of and controls the extent of fill of buffer 14.

Signal ED is also an input of AND gate 94, where, in conjunction with right margin marker signal MR, it operates to reset flip-flop 96 at the end of a line of scan, thereby closing AND gate 98, eliminating signal CE and ceasing the encoding operation of encoder 12. Thus an entire line at a time is coded and transferred to register 20 before resetting flip-flop 96.

When flip-flop 90 is false (signal RC is not received from coder 12), signal ER′ is effective to prime AND gates 106 and 108. If signal DR cycles counter 86, gate 106, at period C1, generates an output which commands dataset addressor 110 to signal, via signal DA, the lookup in buffer 14 of an address of a code to be transferred through register 20 to dataset 22. This dataset is gated by signal BD from AND gate 108 during period C5–6. Simultaneously, the output of gate 106 causes a unit count to be subtracted in counter 104. This activity, together with the similar activity of gate 100 and encoder addressor 102, thus causes bidirectional counting in counter 104, thereby indicating the number of codes presently being stored in buffer 14.

At the beginning of a document scan, buffer 14 must be initially filled before starting transfers to dataset 22. Signal BL′ turns flip-flop 116 true, thereby enabling AND gate 118 to pass signal CT. The output of gate 118 sets flip-flop 120, generating signal DR, already discussed, for every transfer of a bit to dataset 22.

Signal BL, it has been pointed out, indicates that further codes may be inserted into buffer 14. This is accomplished through AND gate 112 which triggers flip-flop 96 true when signal BL coincides with left margin marker signal ML at period C8. Sensing of signal ML establishes that coding will occur only for line scans on document 48 (FIGURE 1).

It may also be seen that the same output of flip-flop 96 that energizes gate 98 is effective at AND gate 114, where it is combined with signal MR to form signal I, when the transfer of the codes for the present line is finished, thereby instructing scannar 10 to increment vertically.

While the invention has been particularly shown and described with reference to preferred embodiments thereof, it will be understood by those skilled in the art that the foregoing and other changes in the form and details may be made therein without departing from the spirit and scope of the invention.

What is claimed is:

1. In a digital transmitter including a mechanical scanner and converter for generating a binary signal stream corresponding to information content of a source document, an encoder for generating codes corresponding to the binary signal stream, a buffer for storing the codes, a dataset for remotely communicating the codes and a register to provide input and output of codes among the encoder, buffer and dataset, a control unit connected among all other units, comprising:

means to effect said scanner and said converter to generate repeatedly a binary signal stream from a complete line of scan and a start signal corresponding to the start of said complete line of scan;

said buffer operatively connected for continuous transfer of said binary stream to said dataset through said register;

signal generating means to generate a content signal when said buffer information content is sufficiently low to accommodate a line of said stream to effect movement into the buffer from the encoder through the register;

means responsive to said content signal and said start signal to cause said encoder to receive a line of said stream from said scanner; and buffer entry means to cause entry of the codes generated by said encoder into said buffer through the register.

2. The combination of claim 1 and:

means responsive to the said buffer entry means to cause the said scanner and said converter to generate repeatedly another binary signal stream corresponding to the next complete line of scan on the document.

3. The combination of claim 1 wherein:

code transfers between said register and the said encoder and the said buffer are parallel by bit whereas code transfers between said register and said dataset are serial by bit.

4. The combination of claim 1 wherein said encoder generates run length codes.

5. The combination of claim 1 wherein:

said signal generating means includes a bidirectional counter incremented for each code received by said buffer and decremented for each code emitted by buffer.

6. The combination of claim 1 wherein:

the said scanner, said converter and said encoder are capable of generating codes in excess of the rate at which the dataset is capable of receiving codes.

References Cited

UNITED STATES PATENTS 3,061,672 10/1962 Wyle.

RIGERT L. GRIFFIN, Primary Examiner

B. L. LEIBOWITZ, Assistant Examiner

U.S. Cl. X.R.

178—6.8